United States Patent Office 3,101,131
Patented Aug. 20, 1963

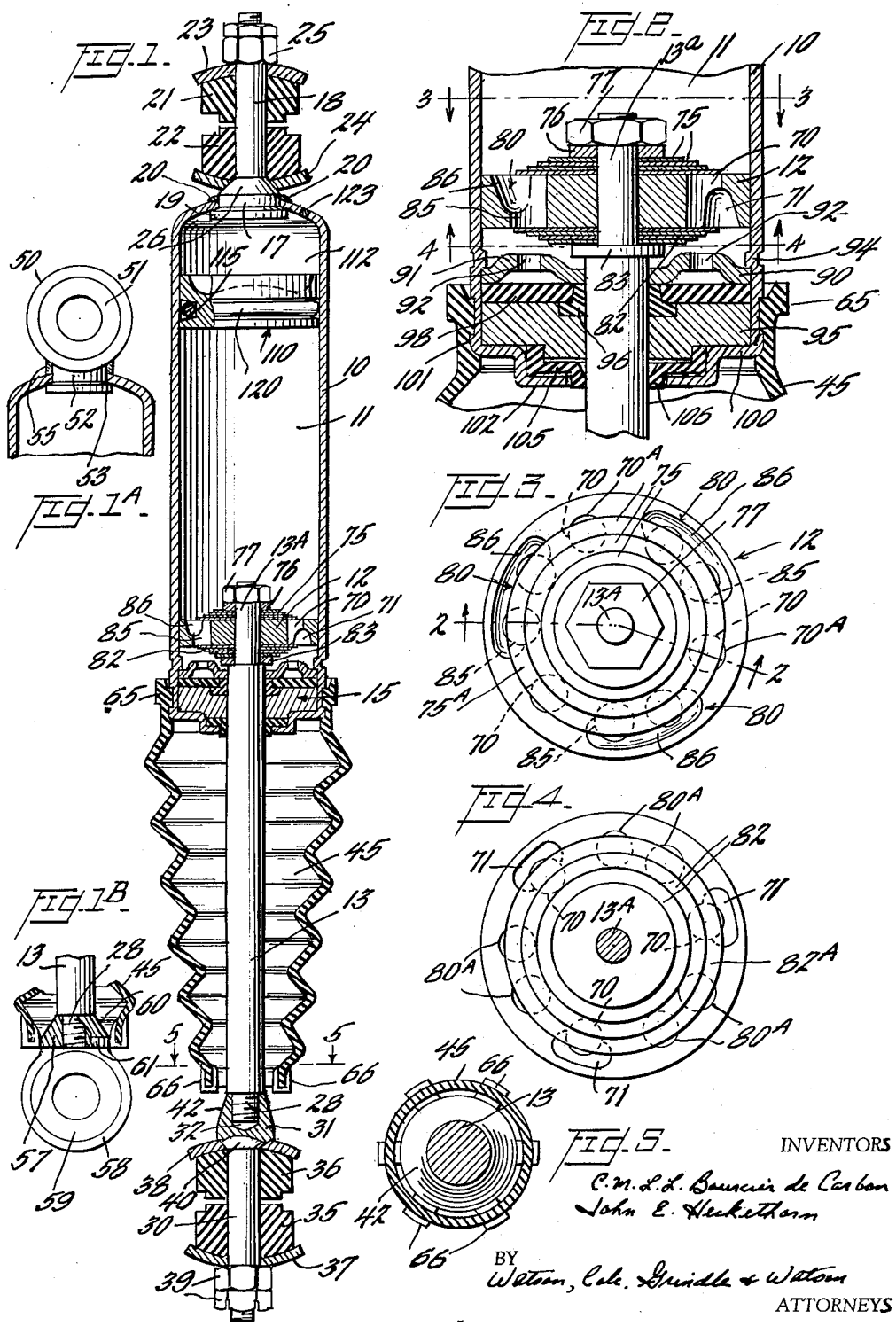

3,101,131
HYDRAULIC PNEUMATIC SHOCK ABSORBER
Christian Marie Lucien Louis Bourcier de Carbon, Neuilly-sur-Seine, France, and John E. Heckethorn, Dyersburg, Tenn.; said Heckethorn assignor, by mesne assignments, to said Bourcier de Carbon, Neuilly-sur-Seine, France
Filed Nov. 7, 1960, Ser. No. 67,784
6 Claims. (Cl. 188—88)

This invention relates to shock absorbers of the hydraulic direct-acting telescoping cylinder-and-piston type and more particularly to shock absorbers of this class in which the working chamber is pressurized by the introduction into one end thereof of a volume of gas under pressure, this provision taking the place of the more conventional valve-controlled reservoir into which regulated flow of damping liquid is adapted to occur upon displacement of such liquid by the inward or compression movement of the piston rod.

The general object of the invention is the provision of a novel and improved pressurized or combined hydraulic and pneumatic shock absorber, capable of use in connection with the spring suspensions of automotive vehicles and aircraft, and in many other industries. The resulting shock absorber is quite versatile and can be installed in horizontal and inclined positions as well as vertically. When applied to motor vehicles, it affords improved riding qualities while at the same time offering increased durability; resistance to wear, impact and corrosion; economy of space lengthwise; and ease of installation.

The invention in its preferred embodiments, contemplates the provision in a shock absorber of this classification, of a cylinder of quite heavy gauge and of a diameter much larger than that of conventional shock absorbers of this general type now in use. However, although the working piston must of necessity be of the same increased dimensions, the diameter of the piston rod is not proportionately increased, whereby the ratio of the cylinder and piston rod cross-sectional areas is established at a very high figure for purposes which will be developed as the specification proceeds. The increased area of the working piston keeps the pressure in pounds per square inch on the piston faces at a lower than usual amount for a given resistance value, and the piston valving for control of flow in both directions is of the progressive type.

Closely related to the features just mentioned is the provision of a floating piston or partition member separating the working liquid in the cylinder from the gas under pressure occupying one end portion thereof. Novel packing or sealing means are provided between the outer periphery of the partition and the inner wall of the cylinder, serving to permanently separate the gas and damping liquid but permitting instant reaction to movement of the working piston without the lag which is inherent in other shock absorbers.

Concomitant with these principal distinguishing novel provisions are the use of a heat treated stainless steel piston rod, improvements in the construction of the boot or bellows used to protect the rod from impact and abrasion, and novel and improved means for securing the attaching studs or loops to both the closed end of the cylinder and the projecting end of the piston rod.

Involved in these securing means are certain novel and advantageous changes in the bushing or grommet retaining washers which are carried by the attaching studs.

Other objects and features of novelty will be apparent from the following specification when read in connection with the accompanying drawings in which certain embodiments of the invention are illustrated by way of example.

In the drawings:
FIGURE 1 is a view in vertical cross-section of a shock absorber embodying the principles of the invention;
FIGURE 1A is a detail sectional view showing the attaching means for the upper end of the shock absorber cylinder in an embodiment wherein a loop or eye is employed;
FIGURE 1B is a view partly in elevation and partly in section of a piston rod connection employing a loop or eye;
FIGURE 2 is an enlarged sectional view showing to better advantage the construction of the piston and the piston rod seal;
FIGURE 3 is a top plan view of the piston as seen from line 3—3 of FIGURE 2;
FIGURE 4 is a bottom plan view of the piston as viewed from line 4—4 of FIGURE 2, an attenuated end portion of the piston rod being shown in section; and
FIGURE 5 is a transverse sectional view through the piston rod and the protective bellows-like boot.

The shock absorber illustrated in FIGURE 1 of the drawings is of the stud-attached type as compared with the eye or loop-attached embodiment suggested in FIGURES 1A and 1B of the drawings. In FIGURE 1 the cylinder of the shock absorber is indicated at 10 and encloses a chamber 11 which contains a body of oil or other liquid damping fluid compound through which the piston 12 reciprocates. Rigidly secured to the piston 12 is the piston rod 13 which passes through a piston seal assembly 15 which will be described in detail presently.

The piston rod 13 is preferably of heat treated stainless steel. As a special feature of novelty of the present invention, the purpose and function of which will be explained, the cross-sectional area of the working chamber of the shock absorber within the cylinder 10 (which of course approximates the cross-sectional area of the piston 12) is about seventeen times that of the cross-sectional area of the piston rod. This ratio can vary within certain limits while still retaining the benefits of the construction, but should not be less than 12:1, and any ratio greater than 20:1 would probably be impractical.

Also, while the longitudinal dimensions of the shock absorber are approximately those of conventional installations for automotive use, the cylinder and piston diameters and cross-sectional areas are considerably larger than usual, a preferred diameter being about 1¹³⁄₁₆ inches with a corresponding area of about 2⅝ square inches. Approximate optimum limits would be between 1¾ inches and say 2.00 inches with areas between about 2.40 and 3.00 square inches. The virtues of this feature will be explained as the specification proceeds.

The upper end of the tubular wall of the cylinder 10 is spun inwardly to embrace the shouldered inner end portion 17 of the upper stud element 18. This lower end of the one-piece stud has flared margins as at 19 to underlie the margins of the remaining opening of the cylinder and this provides a very firm sealing interlock between the stud and the cylinder, which may be reinforced and made gas-tight by the weld indicated at 20. Although the constriction of the tubular upper end of the cylinder wall may be hot spun, it is preferred that it be accomplished by a cold drawing process, which precludes the formation of oxides on the inside of the cylinder the presence of which could distort, and also shorten the life of an elastomeric O-ring which is carried by a floating piston within the cylinder, to be later described. Of course, after repeated drawings the hole is bored to the proper size to receive the stud or eye connectors.

The stud 18 passes through openings in the upper and lower large-sized rubber bushings or grommets 21 and 22 and also through the sturdy bushing retaining washers 23 and 24, the entire attaching assembly being clamped together in application to the members to which they are to be applied, for example, an automotive wheel suspension, by means of the nuts 25.

Another important feature of the present invention is the tapering of the rather heavy lower washer 24 and the conical portion 26 of the lower end 17 of the stud. This conical relationship of the contacting surfaces of the head of the stud and the hole in the washer is effective in many respects both in the construction and assembling of the shock absorber and in actual use. The neck portion of the head 17 of the stud 18 is strengthened because of the conical or angular shoulder which acts as a gusset, and all this without sacrificing the length of this part. Also, the retaining washer 24 is self-centering because of the tapered or conical contact and there is no possibility of a clearance space occurring which could damage the rubber bushing 22.

Best of all, with this construction, it is possible to match existing compressed and extended lengths of the shock absorber without reducing the gas chamber within the cylinder to an impractical length.

Referring now to the lower end of the piston rod 13 as viewed in FIGURE 1, it will be seen that an attenuated end portion 28 of the rod is threaded and the lower stud 30 is provided with a head 31 which is drilled out to form a socket 32, the walls of which are threaded to receive the end 28 of the piston rod. This threaded arrangement cooperates fully with the provision of the heat treated stainless steel rod, which renders the conventional welding of attaching elements thereto impractical.

The lower stud 30 passes through openings in the rubber bushings 35 and 36 through the washers 37 and 38, and the clamping nuts 39 are applied to the end of the stud.

The head 31 of the stud is formed externally with a double taper; the frusto-conical portion 40 is chamfered to conform to the correspondingly chamfered hole in the center of the washer 38, and the upper portion is provided with a slightly more gradual axial taper as indicated at 42 for a purpose to be described in connection with the presentation of the novel protective boot or bellows indicated at 45.

Besides the advantages of the tapered interlocking connection described in conjunction with the upper stud 18, the provision of the taper 40 on the head 31 of the lower stud serves to strengthen this part of the connection (which may be subjected to considerable strain) by providing a parallel conical surface spaced from the conical bottom of the recess 32 formed by the drill in creating the recess. This affords considerable strengthening thickness between the parallel conical surfaces of the recess and the head of the stud.

Attention will be diverted briefly now to the alternative embodiment shown in FIGURES 1A and 1B of the drawings. In this embodiment, eyes or loops are provided at the opposite ends of the shock absorber for attachment to the members to be damped, the upper loop being indicated at 50 as surrounding the bushing or grommet 51 and being welded to a plug-like extension 52 with a flange 53 adapted to underlie the walls of the opening in the inwardly spun end of the cylinder 10. The plug 53 is welded as at 55 to form an air-tight connection and also to provide a rigid construction, the welding strength conditions here being ideal due to the large weld area provided.

The lower end of the piston rod 13 in FIGURE 1B of the drawings has its threaded extension 28 screwed into the frsuto-conical cap member 57 and this member is in turn solidly welded to the lower eye or loop 58 which encloses the bushing 59. The outer surface of the plug 57 is inclined at 60 and is cylindrical at its lower portion as shown at 61.

The protective boot or bellows 45 serves to prevent percussion or abrasion of the highly polished and burnished heat treated stainless steel rod 13 and it is of the annularly pleated and tapered construction which features certain of the shock absorbers disclosed in prior patents to Bourcier de Carbon, the assignee of the present application. The upper annular neck portion 65 of the bellows is provided with an inwardly directed flange which snaps around the lower end of the cylinder 10, and the somewhat constricted lower end portion of the bellows is provided with an annular series of spaced block enlargements 66 extending upwardly for a short distance upon both sides of the lower end portion of the bellows and across the bottom of said portion, as clearly shown in FIGURES 1, 1B and 5, of the drawings. This inner and outer splined construction involving the enlargements 66 provides better "breathing" during the time that the bellows is compressed and also provides a wear-resisting guide for the bellows which cooperates with the tapered surfaces 42 or 60 of the lower connections. When the lower end of the bellows passes over the head 31 of the stud or the plug 57 of the loop connection the air must pass in and out of the interior of the bellows through the splined construction. This permits the maximum possible free length of the bellows while still retaining minimum possible bellows compressed length. Also, in case the lower end of the bellows should become everted, the ribs on the normally outer surface come into play.

The piston 12 will be briefly described in connection with FIGURES 1, 2, 3 and 4. It will be noted that the cross-section of the piston as depicted in FIGURE 2 is as taken on line 2—2 of FIGURE 3.

A group of three single passageways 70 pass through the piston 12 at symmetrical intervals of 120° and these passageways are for the most part approximately cylindrical, but, as best shown in FIGURES 2 and 4, have substantially ovate intake enlargements 71.

These passageways have their outlet orifices opening through the upper surface of the piston controlled by the set of disc valves 75 which in repose, lie flat against the upper surface of the piston and are held in place by the retaining washer 76 and the nut 77, the attenuated upper end portion 13a of the piston passing through openings in these elements.

Thus, it will be seen that the valving 75 controls the passage of damping liquid through the passageways 70 when the piston is in its downward or outward travel during the expansion stroke. In automotive parlance, assuming that the shock absorber is to be employed in a wheel suspension, this is the rebound stroke and the passageways 70 may be termed rebound passageways and the valving 75 the rebound valving.

Parenthetically, it may be stated at this point that the present shock absorber may be installed in practically any situation where the movement of two relatively moving members is to be damped and is not strictly limited to automotive application. Further, it will be realized as the description proceeds, that the shock absorber can be used in practically any position; vertically with the cylinder uppermost as shown in FIGURE 1; in a vertical position but with the cylinder downward; or in any intermediate, horizontal, or inclined position.

A group of twinned passageways each of which is given the general reference numeral 80 is provided in alternation with the passageways 70. These passageways have individual outlet orifices opening through the bottom surface of the piston and controlled by the valving 82 which is clamped against the bottom surface of the piston by means of the washer 83.

The cylindrical twin passageway portions 85 merge into the common ovate intake enlargement or recess 86 as clearly shown in FIGURE 3. The series of passageways 80 may be designated compression passageways and the valving 82 compression valving and it will be readily seen that the by-passing of damping liquid through the piston on the inward stroke thereof is controlled by this arrangement.

For purposes which will be fully developed below, the outer disc 75a of the valving 75 is of a diameter which brings it just short of the outermost arc of the inlet orifices of the passageways 70 and this leaves a small predetermined crescent-shaped permanent opening 70a which permits a certain amount of piston movement at low velocities without flexing the valving. Similarly, at least one of each pair of passageways 85 extends slightly beyond the outer periphery of the larger valve disc 82a which provides upon at least one of each pair of inlet orifices a crescent-shaped permanent opening designated 80a. In the embodiment illustrated both orifices have these crescent openings.

Furthermore, it will be noted that the 120° spacing of the groups of passageways in each series and the relationship of the diameter of the confining washers 76 and 83 is such as to produce cylindrical flexing of the valves which insures progressive valve action all the way from the time the valves being to flex in the slightest degree, up to their limit of flexure. This feature, together with the provision for orifice control through the use of the permanently open crescents 70a and 80a, has been found to be an important cooperative factor in the provision of this novel pressurized shock absorber.

With reference to the permanent openings, it will be noted that there are a total of nine of these openings, six being located on the lower or compression valve face of the piston and three on the upper or rebound valve face. When the piston is moving slowly in either direction, light damping is obtained by forcing the hydraulic liquid through these nine crescent-shaped permanent openings, and the resistance is determined by the calibration of the area of these openings by selection of the proper valve disc diameters. Of course, for light settings the valve discs are smaller, and for firm settings the valve discs are large and nearly cover the outlet orifices of the passageways.

Preferably, higher velocity control is primarily determined by the valve disc thicknesses. Thin flexible valve discs are used on the compression face and thicker more rigid discs are used on the rebound face. With the diameter ratios indicated as preferable, all of the valve discs are flexible discs of very large diameter and not subject to fatigue.

The present piston provides unique straight-through flow. The large streamlined inlet openings provide substantially instantaneous reaction to any load condition and tortuous fluid flow through the piston has practically been eliminated. The progressive control provided by the piston makes it possible to provide an excellent boulevard ride, when the shock absorber is employed in automotive wheel suspensions, with ample reserve control for the roughest roads and for high speed driving. As vertical wheel velocity increases, the control provided by this piston increases in the correct proportion.

The piston employed in the present shock absorber provides outstanding temperature compensation. The thin flexible discs flex less when the damping liquid is hot, and they flex more when the damping liquid is cold. The resistance versus temperature curve produced by this type of valving is flatter than in the case of the usual blow-off valved or orifice control pistons.

Maximum fluid pressure is developed at maximum velocity on the rebound stroke, and rebound control depends upon cylinder bore area minus piston rod area. The piston rod cross-sectional area amounts to quite a large proportion of the cylinder cross-section area in the case of small bore shock absorbers, and in attaining a given amount of rebound resistance the rebound valve discs must be subjected to a very considerable fluid pressure per unit area, sometimes ranging from say 500 p.s.i. to well above 800 p.s.i., some even attaining a maximum fluid pressure of 1600 p.s.i. With the present pressurized shock absorber device, with its exceedingly large piston area, to create a rebound resistance value of 250 pounds, it is only necessary to develop approximately 103 pounds per square inch fluid pressure against the rebound valve discs, and this pressure should rarely exceed 390 pounds per square inch.

Another advantage of the present piston construction, especially in the pressurized shock absorber of the type described herein, is in connection with the reduction of shear in the shock absorber damping liquid. The liquid in most shock absorbers is reduced in viscosity due to shear. The high pressures and tortuous paths imposed on the liquid during operation shears or separates the various additives and other constituents of the fluid and gradually lowers the viscosity. This results in a progressive loss of damping throughout the life of the shock absorber. However, the enormous piston area and the streamlined direct flow orifices of the present piston greatly reduce the phenomenon of shear in the present pressurized shock absorber, and insures uniform damping characteristics throughout the life of the instrument.

Also, practically unlimited valve settings are possible with the present piston. Various combinations of valve disc diameters, thicknesses and stack-ups provide extremely wide latitude of resistance values for standard and special requirements. By the judicious selection of characteristics, any ratio of compression to rebound resistance can be provided.

Finally, the above described progressively acting piston of the neighborhood of $1\tfrac{13}{16}''$ in diameter provides a smooth, positive and uniform action which cannot be obtained in conventional shock absorbers of much smaller diameter.

Now proceeding to the piston rod seal assembly which has been designated by the general reference numeral 15, it will be seen that this arrangement follows the general construction and operation as described in the copending application of Dowling and Heckethorn, for Piston Rod Seal for Shock Absorbers, Serial No. 54,759, filed Sept. 8, 1960, and is more fully described in detail in that application. It is sufficient to recite here that the assembly comprises an inner rigid retainer disc 90 having an annular embossed portion 91 perforated at intervals with openings 92 and stopped against upward movement by being seated against the stakings shown at 94. A guide plate 95 of sintered powdered metal and graphite is inserted in the open end of the cylinder and provided with a central opening through which the piston rod 13 passes. Between the inner retainer disc 90 and the guide disc or plate 95 there is interposed the actual friction seal members which comprise the central oil seal element 96 which is molded from a specially compounded polyurethane material with excellent properties of toughness, wear resistance, low friction characteristics, and oil resistance. The oil seal element 96 is "actuated" by hydrostatic pressure obtained from the internal pressure of the shock absorber as a whole by the provision of the openings 92. This pressure acts against a seal actuator disc 98 which is initially slightly oversized in diameter and under pressure exerts an inward radial effort against the seal 96. The actuator 98 is molded from an oil resistant buna compound.

The rod guide member 95 is held in true squared-up position with respect to the end of the cylinder by means of the outer retainer element 100 which has an outer flange 101 resistance welded to the wall of the cylinder. The central portion of the retainer 100 is bulged downwardly as at 102 and accommodates the dust seal or rod wiper element 105 which has a relatively free rod contacting flange 106 which functions efficiently to keep dust, mud, dirt, water, calcium chloride and other foreign elements from entering the rod guide compartment. It is molded from a low friction buna compound and also serves to retain the rod guide lubricant.

Now one of the most important features of the present invention resides in the provision of the floating piston or partition 110 which effectively separates the damping liquid in the working chamber 11 from the compressed gas occupying the reservoir chamber 112 at the top of the cylinder 10. This floating piston provides a permanent separation between the gas and the working liquid and it also permits the column of oil or damping liquid to lengthen or shorten due to either rod movement or temperature changes; and one important virtue of the present piston is that it can react instantly upon initiation of working piston movement without the lag which is inherent in other shock absorber reservoir valving provisions.

This floating piston entirely eliminates the so-called base valves used in conventional shock absorbers. These base valves must meter the hydraulic liquid in and out of the reservoir chamber during each shock absorber stroke. Due to the piston velocity, aeration of liquid, and other problems, the working cylinder is rarely full of fluid. By eliminating the base valve in its entirety and keeping the oil or other working liquid under constant high pressure, these problems have been eliminated.

These advantages are attained by the particular construction of the floating piston which will now be described. The piston is provided with an annular outwardly facing channel or groove 115 which is preferably wedge shaped being wider at the top than at the bottom. There is disposed within the groove 115 an O-ring 120, which is made of a natural or synthetic rubber compound having excellent resistance to compression set, resistance to the action of any shock absorber fluid, excellent cold temperature behavior, resistance to high temperatures, and low friction characteristics. The O-ring has a cross section diameter approximately $\frac{1}{16}''$ less than the width of the groove 115 at the point where the ring would contact the walls of the groove. Thus, when the O-ring is in an intermediate centered position there will be a clearance of approximately $\frac{1}{32}''$ upon either side thereof within the groove.

Bearing in mind that the ratio of the cross-section of the cylinder to the cross-section of the piston rod is in the neighborhood of 16:1 or 17:1, these provisions result in the following advantageous condition. Upon initial slight movement of the floating piston in either direction depending upon the over-balance of pressure either in the damping liquid or the pressurizing gas chamber, the O-ring will roll slightly before it begins to slide upon the inner walls of the cylinder 10. Now the relative movement of the working piston 12 and the floating piston 110 depends upon the ratio of the respective cross-sectional areas of the cylinder chamber and the piston rod. Thus, allowing $\frac{1}{16}''$ total clearance of the O-ring with the walls of its groove, the working piston 12 can move in a given direction approximately one inch to each $\frac{1}{16}''$ of movement of the floating piston. Therefore, from an initial limiting position of the floating piston, a full inch of compression of the shock absorber could occur before the O-ring would complete its rolling movement and begin to frictionally slide against the walls of the cylinder. Incidentally, the O-ring has to be compressed slightly against the wall of the cylinder and the bottom of the groove to effect a perfect seal between the gas and liquid chambers, and this slight compression of the face of the O-ring means that the piston assembly can move somewhat further than above calculated before the O-ring begins to slide. The inclining of the walls of the groove gives an angular component of pressure against the ring and affords more free movements of the working piston before the ring begins to slide.

When the shock absorber is used in an automotive vehicle the travel over most road surfaces will cause the working piston and its rod to move only within the approximate range of $\frac{1}{4}''$ to $\frac{1}{2}''$; very rarely does the piston and rod move as much as one inch. It is believed that the following approximate limitations are desirable for maximum O-ring life: large tube to piston rod ratio, probably not less than 12:1 but preferably around 16 or 17:1, it probably being impractical to exceed the ratio of 20:1; large O-ring width to resist the compression set characteristics of the rubber; a floating piston groove of at least $\frac{1}{32}''$ wider than the cross-sectional width of the O-ring; and a reasonably suitable rubber or synthetic rubber compound for the O-ring which has the properties set forth above.

It is understood, of course, that the installation of the floating piston with its O-ring is a "zero pressure" installation since the pressure on each side of the O-ring is always equal.

Finally, it is thought that the best gas to use in pressurizing the shock absorber is nitrogen. This gas is relatively inert and it aids in prolonging the life of the O-ring and also provides a non-explosive and non-corrosive gas chamber. The pressure in the gas chamber may vary between say 250 p.s.i. to 400 p.s.i., but, of course, in some cases of unusual conditions, it might vary from these normal limits, for example, in extremely cold weather it may drop to 150 p.s.i. in certain cases, and over extended rough road driving in very hot weather the pressure may rise to 600 or 800 p.s.i. In any case, however, the rugged construction of the present shock absorber as described above insures perfect safety of operation.

It is preferred that all of the air in the cylinder be evacuated from the shock absorber just before the nitrogen is injected, in order to prevent moisture-retention and consequent rust. One quite effective method of pressurizing this shock absorber is disclosed in the copending United States application of J. E. Heckethorn, Serial No. 17,961, filed March 28, 1960. The sealed orifice through which the gas has been inserted according to this fusion method is indicated at 123 in FIGURE 1 of the present drawings.

In certain installations, it may be found desirable or convenient to invert the shock absorber so that the piston rod extends upwardly from the cylinder portion, and in this case it might be preferred to install a conventional telescoping tubular steel dust shield. However, such inversion is intended to be included within the broad scope of the invention.

Various changes and modifications may be made in the embodiments illustrated and described herein without departing from the scope of the invention as determined by the subjoined claims.

Having thus described our invention, we claim:

1. A direct acting telescoping cylinder-and-piston shock absorber, comprising a cylinder enclosing a working chamber containing a damping liquid; a working piston disposed for reciprocation in said damping liquid within said chamber and having a piston rod fixedly secured thereto and extending through a packed opening in one end of said cylinder, valved openings in the piston for the controlled passage of damping liquid from one side of the piston to the other upon reciprocation of the piston in the cylinder; means for attaching the remote ends of the cylinder and piston rod respectively to the members the relative movement of which is to be damped; a quantity of gas under pressure disposed within the cylinder at the end thereof remote from the packed end of the cylinder through which the piston rod extends; a floating piston disposed within said cylinder and having a peripheral sealing means contacting the inner walls of the cylinder, said floating piston serving to separate the damping liquid from the gas under pressure, and adapted to be forced outwardly against the pressure of the gas by the liquid displaced by the entrance into the chamber of successive portions of the working piston rod upon the compression stroke of the shock absorber, the sealing means for the floating piston comprising an O-ring of elastomeric material and of circular section seated within a peripheral groove in the floating piston and snugly contacting the bottom of the groove and the walls of the cylinder, the width of the groove being of a predetermined dimension greater than the width of the O-ring section, whereby upon movement of the working piston and the consequent movement of the floating piston in either direction, the O-ring will be subject to rolling movement before it begins to slide along the surface of the cylinder walls, the length of said rolling movement bearing the same ratio to the length of movement of the working piston and that of the said two members, as the ratio of the cross-sectional area of the piston rod to that of the working piston.

2. The shock absorber as set forth in claim 1 in which the said ratio is 1:17, so that for each inch of working piston travel the clearance of the O-ring in its groove in the floating piston must be about 1/17 of an inch to preclude sliding movement of said O-ring during such travel of the piston.

3. The shock absorber as set forth in claim 1 in which the said ratio is between 1:12 and 1:20.

4. The shock absorber as set forth in claim 1 in which the O-ring is made of a natural or synthetic rubber compound having resistance to set, resistance to the action of the working fluid, resistance to the effects of heat, good low temperature behaviour, and suitable low friction characteristics; and in which the walls of the groove diverge outwardly.

5. In a shock absorber of the class described, the combination which comprises a cylinder enclosing a working chamber containing a damping liquid; a working piston disposed for reciprocation in said damping liquid within said chamber and having a piston rod fixedly secured thereto and extending through a packed opening in one end of said cylinder; valved openings in the piston for the controlled passage of damping liquid from one side of the piston to the other upon reciprocation of the piston in the cylinder; means for attaching the remote ends of the cylinder and piston rod respectively to the members the relative movement of which is to be damped; the attaching means for the outward end of the piston rod comprising a connecting element with an inwardly directed tapered shoulder having a frusto-conical surface; and a hollow collapsible piston rod protecting boot having an inner end portion secured to the end of the cylinder through which said piston rod extends, and a substantially cylindrical outer end portion having an annular series of spaced ribs adapted to contact the frusto-conical surface of said tapered shoulder portion of said connecting element during compression of the shock absorber, for maintaining the centering of said boot and minimizing wear, the spaces between said ribs permitting air to enter and leave the boot when the above mentioned parts are in contact.

6. The combination set forth in claim 5 in which the ribs on the substantially cylindrical outer end portion of said boot extend vertically a short distance along both the interior and exterior surfaces and also horizontally across the extreme end of the boot.

References Cited in the file of this patent

UNITED STATES PATENTS

| | | |
|---|---|---|
| 2,106,272 | Elsey | Jan. 25, 1938 |
| 2,164,159 | Millmine | June 27, 1939 |
| 2,252,771 | Katcher | Aug. 19, 1941 |
| 2,334,597 | Badertscher | Nov. 16, 1943 |
| 2,360,748 | Whisler et al. | Oct. 17, 1944 |
| 2,363,125 | Foster | Nov. 21, 1944 |
| 2,546,051 | Whisler | Mar. 20, 1951 |
| 2,647,810 | McCuistion | Aug. 4, 1953 |
| 2,653,681 | McIntyre | Sept. 29, 1953 |
| 2,710,119 | Steele | June 7, 1955 |
| 2,774,446 | Carbon | Dec. 18, 1956 |
| 2,792,914 | Benard | May 21, 1957 |
| 2,849,090 | Koning et al. | Aug. 26, 1958 |
| 2,856,035 | Rohacs | Oct. 14, 1958 |
| 2,882,592 | Carbon | Apr. 21, 1959 |
| 2,927,786 | Templeton | Mar. 8, 1960 |
| 2,981,534 | Peras | Apr. 25, 1961 |
| 2,999,678 | Heckethorn | Sept. 12, 1961 |

FOREIGN PATENTS

| | | |
|---|---|---|
| 201,551 | Australia | Nov. 25, 1954 |
| 781,163 | Great Britain | Aug. 14, 1957 |
| 1,067,391 | France | Jan. 27, 1954 |